Oct. 18, 1932.  Z. O. ST. PALLEY  1,883,830
ELECTRICAL INDUCTION APPARATUS
Filed Feb. 28, 1931
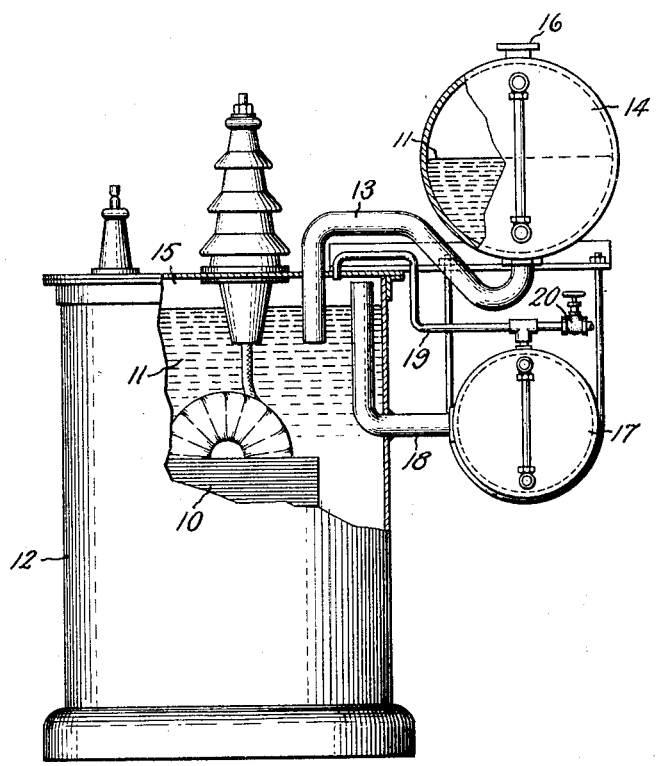
Inventor:
Zoltan O. St. Palley,
by Charles E. Mueller
His Attorney.

Patented Oct. 18, 1932

1,883,830

UNITED STATES PATENT OFFICE

ZOLTAN O. ST. PALLEY, OF PITTSFIELD, MASSACHUSETTS, ASSIGNOR TO GENERAL ELECTRIC COMPANY, A CORPORATION OF NEW YORK

ELECTRICAL INDUCTION APPARATUS

Application filed February 28, 1931. Serial No. 519,235.

My invention relates to electrical induction apparatus and more particularly to apparatus such as a transformer or reactor which is immersed in an insulating liquid within a casing or tank. The temperature of the liquid varies considerably as the rate at which heat is produced in the apparatus changes with variations in load conditions. This causes a considerable expansion and contraction of the liquid which is usually provided for by an expansion chamber or conservator communicating with the main apparatus casing. It is sometimes desirable to have a small gas-filled space above the liquid in the main casing to act as a cushion and help to absorb the initial shock in case of a sudden increase of pressure within the casing. An inert gas is usually used to avoid explosions and it is prevented from escaping by locating the inner end of the connection to the conservator below the surface of the liquid in the apparatus casing. It is preferable that the liquid extend from the apparatus casing into the conservator to a level higher than that in the main casing so that the pressure of the gas will be somewhat above the outside atmospheric pressure and no air can be drawn into the casing in the event of a leak. Any leakage, however, would not only permit the escape of the gas, but the liquid in the conservator would run into and fill the main casing and then escape. The general object of the invention is to provide an arrangement which will prevent such escape of liquid.

The invention will be better understood from the following description taken in connection with the accompanying drawing which shows a conservator type transformer, partly in section, provided with an arrangement constructed in accordance with the invention to prevent escape of the liquid in the transformer casing and conservator.

The invention will be explained in connection with the transformer 10 shown in the drawing. This transformer is immersed in an insulating liquid 11 in a main casing 12, the insulating liquid extending through a pipe connection 13 into a conservator 14 which it partially fills. A body or cushion of inert gas 15, such as nitrogen above the surface of the liquid in the main casing 12, is provided to help absorb the initial shock due to any sudden increase of pressure in the casing. The end of the pipe connection 13 in the casing 12 is below the surface of the liquid 11 and the gas cushion 15 so that the gas 15 is confined above the liquid and cannot escape into the conservator. The conservator 14 is high enough so that the surface of the liquid 11 in it is above the level of the surface of the liquid in the main casing. The pressure of the gas 15 is therefore always higher than that of the outside air which is thus prevented from entering the casing 12 if a leak should develop.

The joints in the casing 12 and in and around its cover are normally tightly sealed to prevent any escape of the gas 15. A leak may develop, however, which will permit escape of the gas. As the gas escapes, it is replaced by liquid from the conservator 14 and if this is permitted to continue after all or most of the gas has escaped, then there will be an escape or leakage of liquid so long as it can be supplied from the conservator. This would be highly objectionable, not only because of the loss of liquid and the necessity of cleaning it up, but the liquid which has generally been used has been a specially prepared mineral oil which is very inflammable.

If a leak develops at the top of the casing 12, so that gas escapes, the level of the liquid in the casing will rise as the escaping gas is replaced by liquid from the conservator 14. The conservator is provided with a breather or vent 16 so that atmospheric pressure is maintained above the liquid 11 in the conservator as the level of this liquid rises or falls. An overflow compartment or tank 17 communicates through a pipe connection 18 with the space containing the gas cushion 15 above the liquid 11 in the main casing 12, the gas 15 normally extending through the pipe 18 and filling the tank 17. The casing 12 and overflow tank 17 are sealed and gas tight to confine the gas 15 which is under a sufficient pressure to keep the level of the liquid in the conservator 14 above that of the liquid in the main casing 12. The opening into the pipe 18 in the casing 12 is below the joints in and around the cover of the casing where leaks are most apt to occur but high enough above the liquid 11 so that under normal conditions none of the liquid can enter the pipe and run down into the overflow compartment 17 which is below the level of this liquid. If gas escapes from the casing 12, the liquid can rise only to the opening in the pipe 18 or slightly above it. After this, any excess liquid will escape through the pipe 18 into the overflow tank 17. The liquid in the casing 12 can therefore never reach a leak in or around the cover of the casing. A pipe 19 connects the upper part of the overflow tank 17 with the upper part of the gas space in the casing 12 so that any gas displaced by liquid in the overflow tank may return freely into the gas space in the casing 12 and excess liquid may run freely through the pipe 18 into the overflow tank. The capacity of the overflow tank 17 should be at least equal to the volume of liquid left in the conservator 14 after the level of the liquid in the casing 12 has risen to the opening in the pipe 18. The normal level of the liquid 11 in the casing 12 may be adjusted as desired by forcing gas into the pipe 19 through a valve 20 or by allowing gas to escape through this valve.

The invention has been explained by illustrating and describing a particular form and application thereof, but it will be obvious that changes may be made without departing from the spirit of the invention and the scope of the appended claims.

What I claim as new and desire to secure by Letters Patent of the United States, is,—

1. The combination with electrical apparatus immersed in a liquid within a casing, and a gas cushion above the liquid in said casing, of a conservator partially filled with liquid and communicating with the liquid in said casing below said gas cushion, and a sealed overflow compartment communicating with said gas cushion above the level of said liquid.

2. The combination with electrical apparatus immersed in a liquid within a casing, and a gas cushion above the liquid in said casing, of a conservator partially filled with liquid and communicating with the liquid in said casing below said gas cushion, a sealed overflow tank communicating with said gas cushion above the level of said liquid, and a pipe connecting the upper part of said overflow tank to the upper part of said gas cushion.

3. The combination with electrical apparatus immersed in a liquid within a casing, and a gas cushion above the liquid in said casing, of a conservator partially filled with liquid and communicating with the liquid in said casing below said gas cushion, an overflow tank communicating with said gas cushion above the level of said liquid, the gas extending from said gas cushion into said overflow tank and said casing and tank being sealed to confine said gas.

In witness whereof, I have hereunto set my hand.

ZOLTAN O. ST. PALLEY.